March 7, 1972 F. NOTARO 3,647,606

SEMIRIGID MULTILAYER THERMAL INSULATION AND METHOD OF MAKING SAME

Filed Nov. 21, 1969

INVENTOR

Frank Notaro

BY John C. Le Dave

ATTORNEY

United States Patent Office 3,647,606
Patented Mar. 7, 1972

1

3,647,606

SEMIRIGID MULTILAYER THERMAL INSULATION AND METHOD OF MAKING SAME

Frank Notaro, Buffalo, N.Y., assignor to Union Carbide Corporation, New York, N.Y.

Filed Nov. 21, 1969, Ser. No. 878,855
Int. Cl. B32b 7/08
U.S. Cl. 161—52 22 Claims

ABSTRACT OF THE DISCLOSURE

A multilayer thermal insulation semirigidized to resist compression and bending by means of a plurality of spaced, thin columns which extend through the insulation layers and are bonded to at least some of said layers.

This invention relates to semirigidized multilayer thermal insulation and to a method of making same.

Extremely effective multilayer insulations have become known in recent years. Among these are insulations comprising a plurality of heat reflective layers separated by low thermally conductive layers such as opaque paper having low conductive fibers oriented perpendicular to the direction of heat transfer as described in U.S. Pat. Nos. 3,007,596, 3,009,600 and 3,009,601. Another type of multilayer insulation comprises a plurality of aluminized polyethylene terephthalate sheets with at least alternate layers permanently deformed as by crinkling or corrugating. A single insulating layer may comprise a low conductive component, such as a polyethylene terephthalate sheet, and at least one radiation reflecting component, such as is formed by aluminizing the low conductive component. Such a radiation reflecting component may be placed on one or both sides of the low conductive component.

These various insulations must be installed damage-free, at uniform density and with minimum thermal "shorting" of high temperature layers to lower temperature layers, in order to achieve high insulating performance. Inasmuch as the insulating materials are fragile, extremely flexible and highly compressible, great care must be taken in their installation to obtain the desired performance. In fact, these insulations have been properly installed in the past only one layer at a time. Such layer-by-layer installation is time consuming, expensive and often requires special tools, equipment and skills to insure proper fabrication. Moreover, upon installation, the layers often slip relative to each other because of low interlayer friction. Another problem is that density variations develop dependent upon the nature of the support provided. Such density variations cannot be avoided even with layer-by-layer installation and require the use of special techniques such as banding and bulking, described in U.S. Pat. Nos. 3,367,530 and 3,357,586, for proper control. Another problem relates to the joining of prefabricated multilayer insulation sections. If the insulation thicknesses are not uniform when butted together, the heat reflective sheets, e.g. metal foil, which contact across the abutting edges may be at different temperatures. This in effect "short circuits" heat from a warmer layer to a colder layer thereby reducing the insulation's effectiveness.

Attempts have been made to quilt preassembled multilayer insulation to obviate the problems heretofore described. One method employed the use of multilayer aluminum foil and low-conductive glass fiber mats which were hand-sewn loosely to plastic outer sheets using four-ply linen thread. However, it was found that such insulations were very flexible and hard to handle. Moreover, the loose quilting permits the layers to slide one against the other so that the assembly of layers becomes skewed and the threads are drawn tighter thereby detrimentally compressing the insulation.

2

Other attempts have been made to rigidize multilayer insulation by impregnating the entire insulation with hardenable binder. This procedure effectively rigidized the insulation but also reduced its insulative efficiency. In addition, the relatively large amounts of binder added much weight to the insulation and created considerable degassing problems in vacuum applications.

In other prior art, insulations have been rigidized and rendered handleable by sealing and evacuating same within a flexible gas tight envelope. The external pressure compresses the insulation and mechanically interlocks the components and particles so that the insulation holds the shape and form as when evacuated. Such compression results in a highly undesirable and often prohibitive increase in solid conduction, as occurs when large amounts of binder are used.

It is an object of this invention to provide a multilayer thermal insulation structure which is able to resist compression and is flexible but firm enough to be handled without substantial physical damage yet is highly efficient in minimizing heat transfer.

Another object is to provide a method of manufacturing such thermal insulation structure.

Other objects will be apparent from the disclosure, drawings and appended claims.

A thermal insulating structure comprising a multiplicity of superimposed insulating layers unbonded to each other can be semirigidized so as to hold its thickness and shape by extending through at least some of the layers of said structure substantially normal to its surface with a plurality of spaced thin columns having one or more filaments and being at least partly coated with adherent solidifiable material which bonds the thin columns to the contiguously surrounding surface of at least some of said insulation layers.

One embodiment of the article of this invention employs face sheets on the outer surfaces of the insulation structures to protect said structures and to provide firm column anchor points with the columns additionally bonded to said face sheets. Other embodiments include columns comprising metallic wire, nonmetallic threads (e.g., quartz thread) or combinations of both types of materials. Such thread or wire filaments may be porous, solid or longitudinally hollow.

A method for manufacturing a semirigid multilayer thermal insulating structure comprises the steps of (a) loosely stacking a predetermined number of insulation layers in superimposed position; (b) extending a multiplicity of thin column members having equivalent diameters of less than 0.10 inch coated with adherent solidifiable bonding material from at least one outer surface through at least some of the stacked insulation layers, said column members being laterally spaced from each other across the structure plane and contiguous to the insulation layers so that solidifiable bonding material flows onto at least some of such insulation layers from the column members; and (c) restraining the stacked insulation layers in a desired final configuration of the structure at least until said bonding material has solidified.

By "loosely stacking" is meant that the superimposed insulation layers are not bonded to each other but rather are merely laid loosely one on another.

The column material is comprised at least in part of a material capable of holding the solidifiable bonding material distributed along the column length.

This method can produce a thermal insulating structure comprising a multiplicity of superimposed insulation layers unbonded to each other and a multiplicity of thin columns having equivalent diameters of less than 0.10 inch distributed over the plane of the structure, each column extending through at least some of said insulation layers and bonded to the contiguously surrounding surface of at least some of said layers, said columns being laterally spaced from each other across the structure plane so as to semirigidize said insulation.

One embodiment of this method employs a stitching procedure; another uses a "looped thread" technique. The method may also include the steps of applying a fiber sheet over the face surfaces of the insulation structure and impregnating the fiber sheet with solidifiable bonding material. When the columns are metallic, a bonding procedure may be employed wherein the tips of the columns are bent at 90° and bonded to the face of the blanket with solidifiable bonding material or by spot welding.

DETAILED DESCRIPTION

Figures 1, 2, 3, 4, 5, 6, 7, 8:
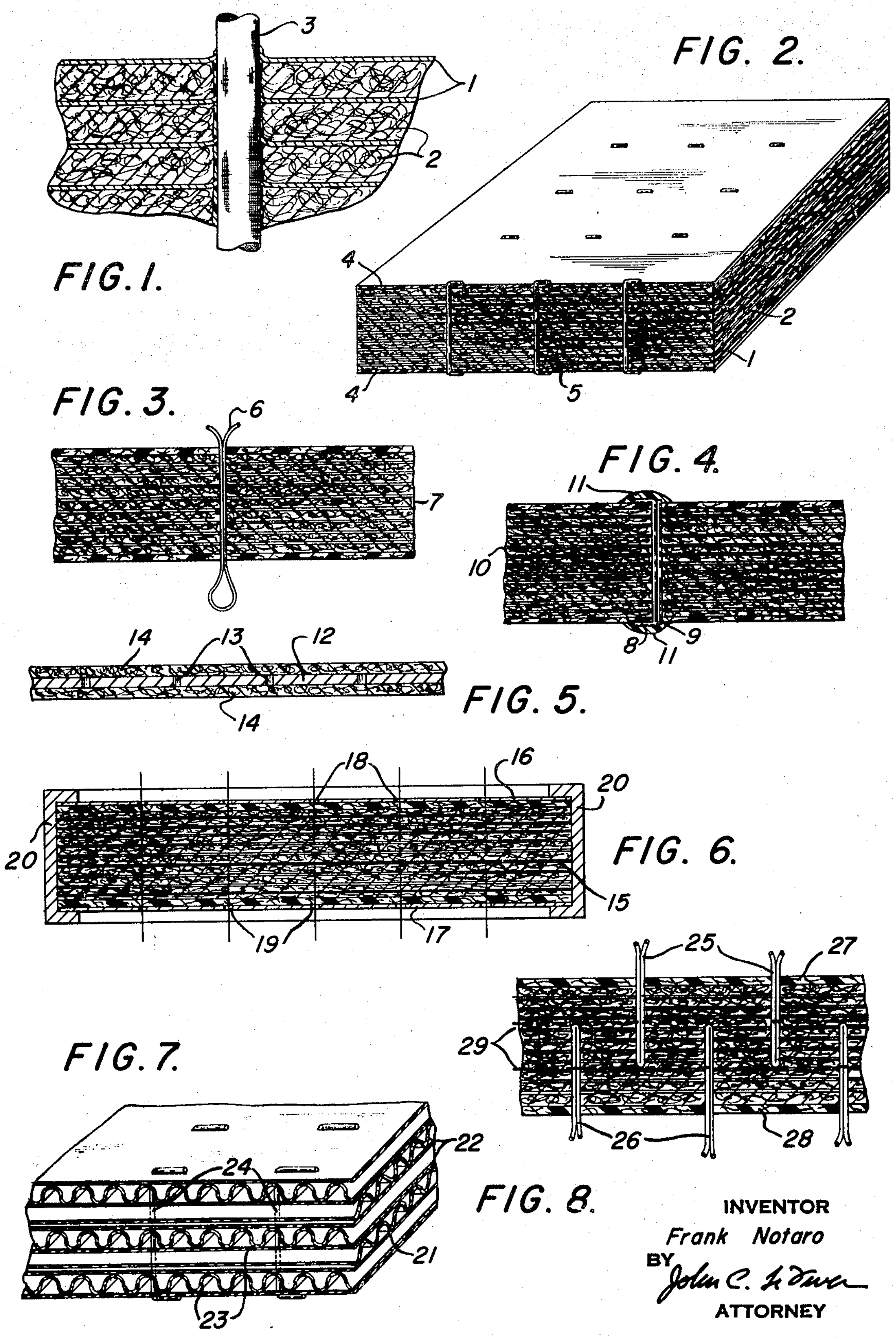
FIG. 1 is a cross-sectional view taken in elevation of a multilayer insulation structure section having a semirigidizing column pierced through and bonded to the layers.
FIG. 2 is an isometric cross-sectional view of a multilayer insulation structure having face sheets, the combination having been sewn through in a pattern with semirigidizing columns.
FIG. 3 is a cross-sectional view of a multilayer insulation structure section having a column formed by extending a loop of column material therethrough.
FIG. 4 is a cross-sectional view of a multilayer insulation structure section having both a metal and nonmetal column therethrough.
FIG. 5 is a cross-sectional view of a metal-nonmetal laminate face sheet.
FIG. 6 is a cross-sectional view of a fabrication apparatus employed in the manufacture of semirigidized insulation.
FIG. 7 is an isometric cross-sectional view of semirigidized, corrugated, aluminized, sheet plastic multilayer insulation.
FIG. 8 is a cross-sectional view of a multilayer insulation structure section semirigidized by partial loop penetration and bonding from both sides of the insulation.

The layers of insulation to be semirigidized, as contemplated in this invention, are not bonded to each other by use of other than the rigidizing columns themselves.

In view of the method of installing semirigidizing columns and the slight permissible increase in thermal conduction experienced when they are employed, an upper limit on column equivalent circular diameter to avoid excessive solid conduction heat transfer would be about 0.10 inch. A lower limit on equivalent diameter would be dependent upon the means of installation and the column material used. Based on material strength, handleability, and the effect on solid conduction heat transfer through the column a range of column preferred equivalent diameters is 0.015 to 0.06 inch. Equivalent circular diameter is defined as the diameter of a circle having an area equal to the cross-sectional area of a given column. Preferably, the column diameters would be within the range 0.015 to 0.06 inch. Recognizing that all suitable column materials need not be circular in cross-section, "equivalent" column diameter contemplates the use of any non-circular column whose cross-sectional area equals that of circular column of the specified diameter.

For most uses, the columns are typically installed with a spacing on the face of the structure of between ¾ inch and 3 inches, and preferably between 1 inch and 2 inches. These are the spacings which have been found suitable for insulations which are relatively dense, having a large number of insulation layers per unit thickness, e.g., 60 to 200 layers per inch. For low density insulations having perhaps 8 to 20 layers per inch, fewer columns spaced perhaps 4 inches apart may be used and will provide a structure somewhat less rigid and more conformable to curved surfaces.

As a further guide in the use of the invention, the total column cross-sectional area should comprise less than 0.3% of the plane of the insulating structure to avoid excessive heat transfer by solid conduction through the columns.

The multilayer insulation structure of FIG. 1 comprises a preassembled stack of radiation reflective layers 1 alternating with and separated by layers of low conductive material 2 such as glass fiber matting. These layers are bonded to a thread of column material 3. Alternatively, at least some of the layers can be arranged to be removable and subsequent to bonding of the remaining non-removable insulation layers to the column 3 said removable layers can be removed leaving an insulation structure comprising at least some radiation reflective layers separated and spaced apart. Removable layers may comprise strips of paper laid in the plane of the structure between rows of columns in alternating sequence with the insulative layers which paper strips overlap the structure at one edge and are withdrawn by pulling on the overlapping portions subsequent to solidification of the columnar bonding material.

FIG. 2 shows a multilayer insulation structure having a multiplicity of penetrating columns 5 with alternate layers of reflective material 1 and low conductive material 2 positioned between protective face sheets 4. This preassembled stack of insulation components is prepared using a predetermined number of layers and predetermined degree of compression so as to provide a desired structure thickness and density. Face sheets 4, precut to the same dimensions as the assembled insulation, are laid against both planer surfaces of the structure. Suitable face sheet materials are woven glass fiber cloth or non-woven fiber papers of glass or quartz. Other face sheet constructions are hereinafter described in detail. Face sheets generally must be highly resistant to deflection under columnar tensile loads, must provide firm anchorage for the column ends, must not present degassing problems and must have low conductivity. Column material 5 is threaded through a large needle and is presoaked in a hardenable bonding material such as epoxy resin. Other suitable bonding materials would be zirconia base cement and aluminum oxide ceramic cement such as Ceramabond #503 manufactured by Aremco Products, Inc., Briarcliff Manor, N.Y. Generally, any bonding material is suitable which is chemically stable, is able to wet the column and insulation material, is suited to the service temperature range and has low degassing properties in vacuum applications. An example of a column material is a quartz fiber thread, 14 mils in diameter. The column material 5 is drawn through the thickness of the insulation structure at spaced intervals of perhaps one inch on a square pattern. The thread may be continuous between points of penetration using a simple alternating upward and downward penetration by the needle. The entire structure is sewn in this manner, taking care that the thickness of the insulation structure is not overly compressed by excessive tension on the column thread. When the entire pattern of penetrating columns is complete the exposed threads may be trimmed and bonded against the face sheets 4 and the face sheet may be impregnated with a hardenable material which can be the same as that employed on the threads. If desired, a finish sheet such as a thin metallic foil (not shown) may be bonded over the structure surfaces to protect the exposed threads. The completed structure is then permitted to harden in the same contour and thickness as when it was assembled and sewn.

After the bonding material has set, the insulation structure will be semirigid with at least some of the layers bonded to the penetrating columns, as shown in FIG. 1. By semirigidized it is meant that the structure will possess substantial strength both in bending and compression and will retain any contour imposed upon the structure during fabrication. It appears that the strength and ruggedness of this semirigidized insulation is due in large part to the secure attachment of individual insulation layers to the columns. The areas immediately over the columns are extremely firm and resistant to compression despite the relatively high length/diameter ratio of the columns. It is probable that lateral support provided by the multiple layers of penetrated insulation accounts for the columnar resistance to buckling. It is seen, therefore, that the columns will be mutually reinforced against buckling if they are interconnected laterally by relatively nonstretchable layers. To this end, it is desirable that various of the layers are non-extensible and planar, i.e., that they be mechanically strong and lie substantially in a plane normal to the axis of the columns.

Alternative methods of providing penetrating columns through the structure are shown in FIGS. 3 and 4. In FIG. 3, a loop of column material is pierced through the insulation structure with a suitable hook or awl and then the hook is withdrawn leaving a double stranded column 6 through the structure 7. This method allows installation of semirigidizing columns from one side of the preassembled insulation.

FIG. 4 shows a column construction ideally suited for high temperature versions of semirigidized insulation. A heat-resistant wire 8 is pierced through the insulation together with a fibrous strand 9. The two materials are cut off at both faces of the structure leaving a short length extending beyond the surfaces. The tips of the wire are then crimped 90° so that they lie flat against the structure surfaces. Finally, the ends of the column are cemented to the surface of the insulation structure 10 by a hardenable cement or resin 11.

The semirigid face sheets 4 of FIG. 2 are not essential but are desirable, particularly when a high degree of strength and rigidity is needed. Face sheets comprising resin-impregnated fiber sheets are well suited for ambient and low temperature insulations. For high temperature insulation structures, a metal screen may be employed, although considerable warpage or distortion of the surface may occur when the structure is temperature cycled.

A preferred face sheet for high temperature service which does not exhibit distortion is shown in FIG. 5. The sheet is a composite lamination consisting of a perforated nickel foil 12 containing for example, 0.25 inch perforations 13 spaced ¾ inch apart in a square or diamond pattern. The perforated foil is covered on each side with a 5-mil thick sheet of quartz fiber paper 14. The assembled sheets are impregnated with a heat-resistant ceramic cement which penetrates through the perforations of the foil and bonds the two fiber sheets together forming a strong composite sheet which remains free of distortion when cycled to high temperature. The nickel foil also provides strong anchoring points for the wire-quartz columns which remain firmly attached thereto even at high temperature.

If desired, the impregnated quartz fiber cover layers may be omitted leaving only a bare metal face sheet. Preferably, the metal sheet is embossed or formed in a continuous pattern so as to permit lateral expansion and contraction relative to the insulation. Columns containing wires as in FIG. 4 are preferred for such structures and the ends of the wires may be bent over and bonded by spot welding to the base metal face sheets. If the face sheets and/or radiation shield layers are of hard, refractory metals not readily penetrated with needle or awl, small holes may be drilled through the assemblied structure at column locations to facilitate extension of the column material through the insulation. If the face sheets with exposed column ends are undesirable, a smooth metal finishing sheet can be finally applied over the surfaces and spot welded at scattered locations to the face sheets.

FIG. 6 illustrates a preferred method for assembling semirigidized insulation structures according to this invention. The preassembled stack of insulation layers together with face sheets as required is shown as item 15. This preassembly is placed between metal templates 16 and 17 co-extensive with the area of the insulation layers. The templates contain aligned holes 18 and 19 at the locations where columns are to be provided through the structure. The insulation and the templates are preferably clamped within a channel-shaped frame 20 which restrains at least two of the four edges of the insulation structure. The bonding material-coated column (not shown) is threaded through the structure at the centers of holes 18 and 19 in the templates using, for example, the column constructions as illustrated in either of the FIGS. 2, 3 or 4. The ends of the columns are cut off near the surface of the structure and are suitably anchored to the face sheets. When the bonding material has hardened, the frame and templates are removed and a finishing cover sheet may be applied to the insulation structure surfaces if desired.

Usually, it is important that the insulation structure be only moderately precompressed when the columns are installed. Excessive precompression will produce high tensile stress in the columns when the compressive force is subsequently released. Under high stress, the columns tend to break and/or pull away from the face sheets, especially when the insulation is subjected to high service temperature. In general, the tensile stress in metal wire supports should be limited to a range of 10,000 to 15,000 p.s.i. Unless caution is exercised, such stress can easily be exceeded. For example, if the insulation structure is compressed uniformly to only 0.2 p.s.i. and the columns are provided at a spacing of 1½ inch using 5-mil wire, the resulting stress in the wire is between 20,000 and 25,000 p.s.i. It will be apparent that the stress can be controlled by the degree of compression imposed upon the insulation, by the diameter of the wire employed at the support points, and/or by the spacing of the columns across the insulation surface. For very high temperature service, e.g., above 1700° F., special metals may be required as column supports, such as molybdenum, tantalum or tungsten.

The preferred bonding material for use in the support columns of high temperature insulations is a zirconia base cement. Such cements exhibits exceptionally low thermal conductivity and are best suited for the columns because the columns span between the hot and cold surfaces of the insulation.

As stated above, metal wire columns are well suited for high temperature service because nonmetal fibrous columns impregnated with most ceramic bonding materials tend to become brittle. However, when wire thread alone is used for the supports, the bonding material must join two non-porous materials, that is, the wire and the foil layers, and it is difficult both to retain the adhesive coating on the wire thread during installation and to bond the insulation layers securely to the columns. Therefore, the preferred practice is to employ both a wire and a fibrous material together as the column thread material, thereby incorporating the favorable properties of both components. The wire lends high tensile strength and flexibility, while the fiber threads aid in bonding the insulation layers to the columns.

The use of this invention is not limited to foil and fiber construction as heretofore disclosed. FIG. 7 illustrates an embodiment employing a dimpled, aluminized, sheet plastic insulation consisting of flat sheets 21 alternating with corrugated sheets 22 and 23. No other separator is used and the columns 24 penetrating through the stack are bonded to both the flat and corrugated layers individually. If desired, the materials may be assembled with all corrugated sheets 22 and 23 positioned with their corrugation parallel. In such case, the resulting rigidized panel will exhibit substantially more resistance to bending in the direction perpendicular to the axis of the corrugations than in the directions parallel to the corrugation.

Alternatively, a structure which exhibits uniform bending strength in both directions can be provided by alternately rotating the corrugated sheets at 90° to one another, as shown in FIG. 7. Suitable materials for constructing insulating structures of either type consist of 1-mil plastic sheet, aluminized on both sides, with alternate sheets corrugated to a depth of perhaps 100 mils. Quartz fiber thread, e.g., 14 mils diameter, is a suitable column material and may be impregnated with epoxy resin. Face sheets may be provided, such as quartz fiber cloth, but these are not essential to prepare a durable insulation structure.

Insulation of the type composed entirely of aluminized plastic sheet without fiber separators is extremely resilient, and even slight compression can drastically reduce its thickness and performance. This invention renders such insulations far more practical and avoids the need to thicken the sheets in order to gain rigidity.

FIG. 8 is an embodiment which incorporates the looped column of FIG. 3 but only in partial penetration of the multi-layer insulation. Loops 25 and 26, introduced from opposite sides of the insulation structure, pierce through their respective face sheets 27 and 28 and penetrate the multilayer insulation to a depth sufficient to have at least one layer of insulation penetrated by both loops 25 and 26. This region of commonly penetrated insulation layers, identified in FIG. 8 as zone 29, should be sufficiently deep to allow adequate mutual reinforcement of loops 25 and 26 which depth will depend primarily on the column density and the rigidity of the insulative layers. The loops on one side of the insulation may be connected as in a continuous stitching procedure. The FIG. 8 arrangement can be employed for example, to compose an insulation structure of two types of multilayer insulation. A portion of the thickness, including the hot side protective layer, may consist of high temperature insulation as disclosed in U.S. Pat. No. 3,139,206, while the remainder of the thickness may consist of low temperature insulation such as aluminum foil and silica fiber. The partially-penetrating columns would be of materials similarly chosen to perform best within their expected service temperature ranges. Composite insulation of this type would combine best performance and minimum material cost for operation between low cryogenic temperatures and temperatures well above ambient.

The following are examples of the durability, semirigidity and low conductivity of insulations of this invention.

Example 1

The durability of semirigidized insulation of this invention was demonstrated by vibration tests of three low temperature rigidized multilayer insulation structures. One structure was oriented parallel to the amplitude of vibration, another normal to the amplitude, and the third at 45° to the amplitude. The insulation structures were constructed of glass fiber paper and ¼-mil polyethylene terephthalate aluminized on one surface alternating at 85 layers/inch through a one-inch thickness. The columns were double-strand 14-mil quartz thread impregnated with epoxy resin and hardener, and were provided on 1½ inch centers in a square pattern. Quartz fiber face sheets were impregnated with the same epoxy resin and hardener.

Vibrations imposed on the test structures varied between zero and 2000 cycles per second with accelerations up to 10 gravities. All structures withstood the test without failure.

Example 2

Thermal conductivity tests were conducted on a high temperature semirigidized insulation blanket constructed of 0.5 mil nickel foil (10.3 gms./sq. ft.) and 5-mil thick quartz fiber paper weighing 2.5 gms./sq. ft. Thirty-eight layers were provided, compressed to about 100 layers/inch for a finished blanket thickness of ⅜ inch. Composite face sheets were not used. Columns were 5-mil Chromel combined with quartz fiber roving and were impregnated with zirconia cement. The test blanket was evacuated to about one micron of mercury pressure and the hot face temperature was varied between 1000° and 2200° R.

Results of these tests indicated about a $.3\times10^{-3}$ B.t.u./hr. ft. ° R. increase in heat transfer over identical insulation without semirigidizing columns. The conductivity of insulation rigidized by impregnating entire insulation structures with hardenable binder or by sealing the insulation inside a flexible envelope which is thereafter evacuated is, by comparison, more than three times greater than comparable insulation of the present invention.

What is claimed is:

1. A thermal insulating structure comprising a multiplicity of superimposed insulation layers unbonded to each other and arranged with low conductive surfaces and radiation reflecting surfaces in contiguous relation, and a multiplicity of thin columns having equivalent diameters of less than 0.10 inch distributed over the plane of the structure, each column being coated with adherent, solidifiable bonding material extending through at least some of the innermost of said insulation layers and bonded to the contiguously surrounding surface of at least some of such innermost layers, said columns being laterally spaced from each other across the structure plane so as to semirigidize said insulation.

2. A structure as described in claim 1 wherein face sheets are provided on the outer surfaces of the insulation structure and the thin columns extend through and are additionally bonded thereto.

3. A structure as described in claim 2 wherein each face sheet comprises a three component laminate, the center component consisting of perforated nickel foil and the outer components consisting of quartz fiber paper impregnated with heat resistant ceramic cement which penetrates through the perforations of the center sheet and bonds the two fiber sheets together forming a unified laminate structure.

4. A structure as described in claim 1 wherein the columns comprise rigidized nonmetallic thread.

5. A structure as described in claim 2 wherein the columns comprise rigidized nonmetallic thread.

6. A structure as described in claim 2 wherein the columns comprise both metallic wire and nonmetallic thread.

7. A structure as described in claim 1 wherein each of the insulation layers comprises a radiation reflecting metal component and a low conductive fibrous component contiguous thereto and arranged in alternating sequence.

8. A structure as described in claim 1 wherein each insulating layer comprises a low conductive component arranged between and contiguous to each of two radiation reflecting components.

9. A structure as described in claim 1 wherein each insulation layer comprises aluminized polyethylene terephthalate with at least alternate layers in corrugated configuration.

10. A structure as claimed in claim 9 wherein alternate corrugated layers are arranged with corrugations at right angles to each other.

11. A structure as described in claim 1 wherein the total column cross-sectional area is less than 0.3% of the structure plane.

12. A structure as described in claim 1 wherein the columns extend into the insulation layers from both outer surfaces of the insulating structure such that columns from opposite surfaces commonly penetrate and bond to at least one common layer of insulation.

13. A method for manufacturing a semirigid multilayer thermal insulating structure comprising:

(a) loosely stacking a predetermined number of insulation layers in superimposed position and arranged with low conductive surfaces and radiation reflecting surfaces in contiguous relation;

(b) extending a multiplicity of thin column members having equivalent diameters of less than 0.10 inch coated with adherent solidifiable bonding material, from at least one outer surface through at least some of the innermost of the stacked insulation layers, said column members being laterally spaced from each other across the structure plane and contiguous to the insulation layers so that said solidifiable bonding material flows onto at least some of such innermost insulation layers from the column members; and (c) restraining the stacked insulation layers in a desired final configuration of the structure at least until said bonding material has solidified.

14. A method as described in claim 13 wherein face sheets are positioned over the outer surfaces of the loosely stacked insulation layers prior to step (b), whereby the columns bond to the face sheets as well as to at least some of said insulation layers.

15. A method as described in claim 13 wherein the insulation layers comprise radiation reflecting sheets and low conductive layers in alternating sequence.

16. A method as described in claim 13 wherein the insulation layers comprise aluminized polyethylene terepthalate with at least alternate layers in corrugated configuration.

17. A method as described in claim 13 wherein the column members are extended through the insulating layers as loops.

18. A method as described in claim 13 including after step (b) the steps of trimming the column members protruding beyond the outer surfaces of said insulation; and bending the trimmed columnar ends to lie contiguous to the surfaces from which they protrude.

19. A method as described in claim 18 including the additional step of bonding the bent columnar ends to their respective outer surfaces.

20. A method as described in claim 13 wherein the superimposed insulation layers of step (a) are radiation reflective layers which are separated by removable layers in alternating sequence which removable layers are removed after step (c).

21. A method according to claim 13 wherein the loosely stacked insulation layers are temporarily compressed to a predetermined density as the restraining step (c) at least until said bonding material has solidified.

22. A structure as described in claim 1 wherein sheets of metal reflecting foil and low conductive fiber arranged in alternating sequence comprise said insulation layers.

References Cited

UNITED STATES PATENTS

| | | | |
|---|---|---|---|
| 2,292,513 | 8/1942 | Fourness et al. | 161—52 |
| 1,345,693 | 7/1920 | Pye | 161—50 X |
| 3,152,033 | 10/1964 | Black et al. | 161—50 |
| 1,925,453 | 9/1933 | Mazer | 161—53 X |
| 2,789,076 | 4/1957 | Frieder et al. | 161—53 |
| 2,071,322 | 2/1937 | Balfe | 161—53 |
| 2,509,494 | 5/1950 | Gruenwald | 161—69 X |
| 2,692,219 | 10/1954 | Slayter et al. | 156—93 X |
| 2,514,412 | 7/1950 | Owens | 156—93 X |

PHILIP DIER, Primary Examiner

U.S. Cl. X.R.

156—93; 161—53, 68, 115, 133, 146, 196